United States Patent
Okochi et al.

(10) Patent No.: US 11,878,320 B2
(45) Date of Patent: Jan. 23, 2024

(54) POWDER LAYER COMPOSITE, COATING FILM, POWDER COATING METHOD, AND POWDER COATING APPARATUS

(71) Applicant: Panasonic Intellectual Property Management Co., Ltd., Osaka (JP)

(72) Inventors: Motohiro Okochi, Osaka (JP); Akihiro Horikawa, Osaka (JP); Toshiyuki Kojima, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 64 days.

(21) Appl. No.: 17/396,645

(22) Filed: Aug. 6, 2021

(65) Prior Publication Data
US 2022/0080434 A1    Mar. 17, 2022

(30) Foreign Application Priority Data

Sep. 16, 2020 (JP) .................. 2020-155855

(51) Int. Cl.
- *B05B 7/00* (2006.01)
- *B05B 7/14* (2006.01)
- *B05B 5/025* (2006.01)
- *B05B 17/06* (2006.01)
- *C08L 33/08* (2006.01)

(52) U.S. Cl.
CPC ............ *B05B 7/144* (2013.01); *B05B 5/0255* (2013.01); *B05B 17/0607* (2013.01); *C08L 33/08* (2013.01)

(58) Field of Classification Search
None
See application file for complete search history.

(56) References Cited

U.S. PATENT DOCUMENTS

| | | | |
|---|---|---|---|
| 4,933,382 A * | 6/1990 | Kitagawa | C08G 59/5073 523/428 |
| 6,040,004 A | 3/2000 | Matsumoto et al. | |
| 2003/0006250 A1 | 1/2003 | Tapphorn et al. | |
| 2003/0148028 A1 | 8/2003 | Kimura et al. | |
| 2004/0119795 A1 | 6/2004 | Noolandi et al. | |
| 2004/0157961 A1* | 8/2004 | Tullos | C09D 5/032 427/372.2 |
| 2008/0187423 A1 | 8/2008 | Mauchle et al. | |

(Continued)

FOREIGN PATENT DOCUMENTS

| | | |
|---|---|---|
| DE | 3826101 | 2/1990 |
| DE | 4426264 | 2/1996 |

(Continued)

OTHER PUBLICATIONS

Extended European Search Report dated Jan. 3, 2022 in corresponding European Patent Application No. 21188390.5.

*Primary Examiner* — Stefanie J Cohen
(74) *Attorney, Agent, or Firm* — Wenderoth, Lind & Ponack, L.L.P.

(57) ABSTRACT

A powder layer composite includes a base and a powder layer having a thickness of 100 μm or less and disposed on the base. An average of a total value of a number of powder aggregates having a long diameter of 500 μm or greater and a number of pinholes having a long diameter of 500 μm or greater, in any of a plurality of different regions of 20 mm×20 mm on a surface of the powder layer, is 0.2 pieces/cm$^2$ or less.

13 Claims, 10 Drawing Sheets

(Table 2)

| | Powder layer | | | Coating film | | | |
|---|---|---|---|---|---|---|---|
| | Total number of powder aggregates and pinholes | | | Film thickness (μm) | Arithmetic average roughness Ra (μm) | Void distribution | |
| | 500μm or greater (Pieces /cm$^2$) | 100μm or greater and less than 500μm (Pieces /cm$^2$) | 50μm or greater and less than 100μm (Pieces /cm$^2$) | | | Maximum (%) | Minimum (%) |
| Example 1 | 0 | 39.2 | 100 以上 | 23.5 | 2.1 | 423 | 0 |
| Example 2 | 0 | 4.2 | 30.8 | 3.2 | 0.3 | 123 | 79 |
| Example 3 | 0 | 2 | 5.6 | 2.9 | 0.2 | 106 | 86 |
| Comparative example 1 | Crack | Crack | Crack | 50 | 5.3 | 946 | 0 |
| Comparative example 2 | 0.45 | 53.3 | Countless | 31.5 | 4.8 | 874 | 0 |
| Comparative example 3 | - | - | - | - | - | - | - |

(56) References Cited

U.S. PATENT DOCUMENTS

| | | | |
|---|---|---|---|
| 2010/0143720 A1* | 6/2010 | Asanuma | C09D 129/14 528/271 |
| 2010/0311881 A1* | 12/2010 | Oshita | C08K 5/134 524/291 |
| 2013/0267647 A1* | 10/2013 | Tsujimoto | C08L 29/14 525/61 |
| 2015/0072151 A1* | 3/2015 | Saito | C09D 7/48 427/195 |
| 2017/0087584 A1 | 3/2017 | Agata et al. | |
| 2017/0173626 A1 | 6/2017 | Ishizuka et al. | |
| 2021/0086214 A1 | 3/2021 | Oda | |

FOREIGN PATENT DOCUMENTS

| | | |
|---|---|---|
| EP | 1953098 | 8/2008 |
| JP | 6-031210 | 2/1994 |
| JP | 8-257444 | 10/1996 |
| JP | 2001-170551 | 6/2001 |
| JP | 2003-230852 | 8/2003 |

\* cited by examiner (a)

(Table 1)

| | Coating material | | Powder coating apparatus conditions | | | | Powder supply | Remarks |
|---|---|---|---|---|---|---|---|---|
| | | Use amount | Spray gun | | Transport air flow rate | | Type | |
| | Type | | Voltage | Current | Main | Sub | | |
| | | (g) | (kV) | (μA) | (MPa) | (MPa) | | |
| Example 1 | MP-1000 | 0.1 | 100 | 35 | 0.08 | 0.03 | Ultrasonic vibration | 100% of output of vibration of ultrasonic vibrator |
| Example 2 | ↑ | ↑ | ↑ | ↑ | - | - | Jet mill | Transport and supply powder to spray gun from crush area at crush air pressure of 0.5 (MPa) |
| Example 3 | ↑ | ↑ | ↑ | ↑ | - | - | Jet mill x2 | Tandem arrangement condition is same as that in example 2 |
| Comparative example 1 | ↑ | - | - | - | - | - | - | Guide coating using wet type (slurry) with applicator |
| Comparative example 2 | ↑ | ↑ | ↑ | ↑ | 0.35 | 0.13 | Cup type | Usual configuration |
| Comparative example 3 | ↑ | ↑ | ↑ | ↑ | 0.35 | 0.13 | Air bubbling type | Bubbling air pressure of 0.5(MPa) |

FIG. 10

(Table 2)

| | Powder layer | | | Coating film | | | |
|---|---|---|---|---|---|---|---|
| | Total number of powder aggregates and pinholes | | | Film thickness | Arithmetic average roughness Ra | Void distribution | |
| | 500μm or greater | 100μm or greater and less than 500μm | 50μm or greater and less than 100μm | | | Maximum | Minimum |
| | (Pieces /cm²) | (Pieces /cm²) | (Pieces /cm²) | (μm) | (μm) | (%) | (%) |
| Example 1 | 0 | 39.2 | 100 以上 | 23.5 | 2.1 | 423 | 0 |
| Example 2 | 0 | 4.2 | 30.8 | 3.2 | 0.3 | 123 | 79 |
| Example 3 | 0 | 2 | 5.6 | 2.9 | 0.2 | 106 | 86 |
| Comparative example 1 | Crack | Crack | Crack | 50 | 5.3 | 946 | 0 |
| Comparative example 2 | 0.45 | 53.3 | Countless | 31.5 | 4.8 | 874 | 0 |
| Comparative example 3 | - | - | - | - | - | - | - |

POWDER LAYER COMPOSITE, COATING FILM, POWDER COATING METHOD, AND POWDER COATING APPARATUS

BACKGROUND

1. Technical Field

The present disclosure relates to a powder layer composite, a coating film, a powder coating method, and a powder coating apparatus.

2. Description of the Related Art

In powder coating, since a base can be coated with a powder coating material, it is not necessary to prepare a liquid coating material using a solvent, which is useful as an environmentally friendly coating method. When a powder having a relatively large particle size, that is, having an average particle size of 10 µm or greater is used, a coating film having a thickness of 50 µm or greater can be formed by one coating without the trouble of recoating. However, when a highly cohesive coating material is used, a step of disassembling an aggregated particle by giving kinetic energy by stirring or the like may be required.

For example, Japanese Patent Unexamined Publication No. 2001-170551 describes a method of transporting powder from a gas blowing type fluid bed type powder tank to an ejection gun, that is, a method for transporting a trace amount of powder in which the powder particles present in a suspended state, that is, as the powder aerosol, are sucked and transported above a level surface of a powder fluid bed in the powder tank.

SUMMARY

According to an aspect of the present disclosure, there is provided a powder layer composite including a base and a powder layer having a thickness of 100 µm or less and disposed on the base. An average of a total value of a number of powder aggregates having a long diameter of 500 µm or greater and a number of pinholes having a long diameter of 500 µm or greater, in any of a plurality of different regions of 20 mm×20 mm on a surface of the powder layer, is 0.2 pieces/cm² or less.

According to another aspect of the present disclosure, there is provided a coating film, in which the coating film has a thickness of 100 µm or less, the coating film is provided on a base, and the coating film has a surface roughness Ra of 5.0 µm or less.

According to still another aspect of the present disclosure, there is provided a powder coating apparatus including: a powder disperser that disperses powder; and a powder supplier that is connected to the powder disperser and supplies the dispersed powder directly onto a base without storing the powder.

BRIEF DESCRIPTION OF THE DRAWINGS

FIG. 9 illustrates Table 1 listing conditions for spraying a powder coating material toward a metal mask; and FIG. 10 illustrates Table 2 listing measurement results of Examples and Comparative Examples.

DETAILED DESCRIPTION OF PREFERRED EMBODIMENTS

When fine particles having an average particle size of 10 µm or less are used as a powder coating material, the cohesiveness of powder is high, and it is difficult to sufficiently perform high-order dispersion by the method of Japanese Patent Unexamined Publication No. 2001-170551. Specifically, it is not easy to form a uniform thin film having a thickness of 100 µm or less with high quality. There is a concern that coating defects such as powder clogging in the coating apparatus due to powder aggregates occur.

An object of the present disclosure is to provide a powder layer composite, a coating film, a powder coating method, and a powder coating apparatus capable of forming a high-quality coating film even when powder having fine particles is used.

The powder layer composite according to an aspect of the disclosure includes a base and a powder layer having a thickness of 100 µm or less and disposed on the base. An average of a total value of a number of powder aggregates having a long diameter of 500 µm or greater and a number of pinholes having a long diameter of 500 µm or greater, in any of a plurality of different regions of 20 mm×20 mm on a surface of the powder layer, is 0.2 pieces/cm² or less. Here, the pinhole means a hole formed by the powder aggregate falling off from the powder layer.

On the surface of powder layer 5 in powder layer composite 100 according to the aspect of the disclosure, there are few powder aggregates and pinholes having a certain size or larger. Therefore, powder layer 5 is formed of uniformly dispersed powder. Furthermore, by heating or pressing powder layer 5, uniform coating film 51 having a small surface roughness can be obtained. Such high-quality coating film 51 may have an excellent appearance and may have excellent performance when being used as an electrode layer of, for example, a power storage device.

Powder Layer Composite and Manufacturing Process Thereof

Hereinafter, the powder layer composite of the exemplary embodiment will be described in detail. Each of the exemplary embodiments described below is a comprehensive or specific example. Numerical values, shapes, materials, configuration elements, arrangement positions and connection forms of configuration elements, processes and the like, which are illustrated in the following exemplary embodiments, are examples, and are not intended to limit the disclosure. Among the configuration elements in the following exemplary embodiments, the configuration elements which are not described in the independent claims describing the highest level concept will be described as any configuration element.

Figure 1:
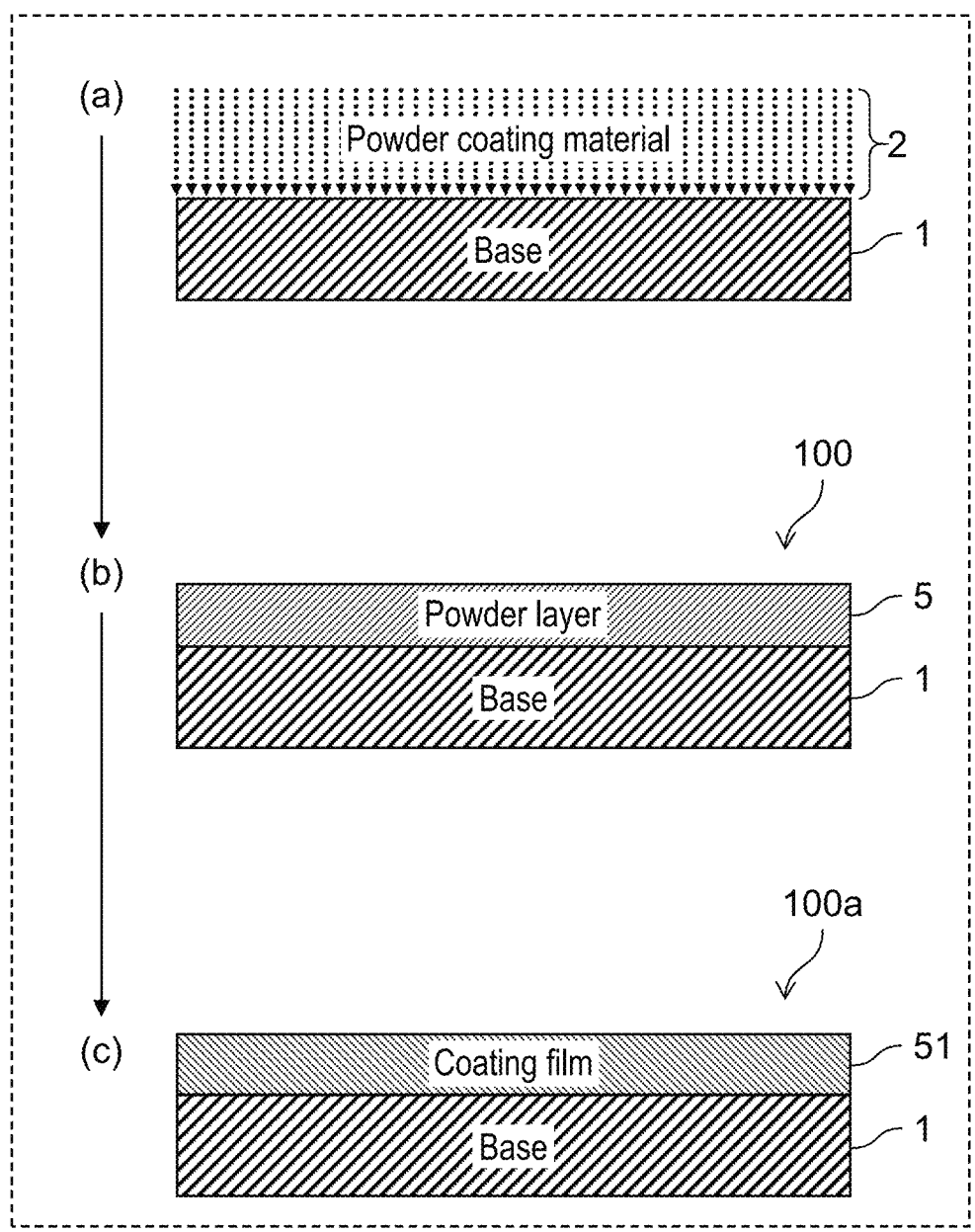
FIG. 1 is an explanatory view illustrating a configuration example of a powder layer composite according to an exemplary embodiment of the disclosure.

FIG. 1 is an explanatory view illustrating an example of a manufacturing process of the powder layer composite and the coating film according to an exemplary embodiment of the disclosure. (a) of FIG. 1 illustrates a schematic cross section of base 1 coated with powder coating material 2. (b) of FIG. 1 illustrates a cross section of powder layer composite 100 obtained by coating. (c) of FIG. 1 illustrates a cross section of powder layer composite 100a obtained by further heating or pressurizing powder layer composite 100.

Powder layer composite 100 in (b) of FIG. 1 has a structure in which powder layer 5 is formed on base 1. The material, shape, and size of base 1 are not particularly limited, and a material capable of forming powder layer 5 by powder coating may be used.

Powder layer 5 is formed by coating base 1 with powder coating material 2 by powder coating as illustrated in (a) of FIG. 1. Powder coating material 2 is not particularly limited as long as powder coating material 2 is a non-conducting material having chargeability, but from the viewpoint of excellent coating efficiency, the volume resistivity value may be, for example, $10^8$ Ωcm or greater and $10^{18}$ Ωcm or less. Furthermore, in order to improve the coating efficiency, the volume resistivity value may be $10^{11}$ Ωcm or greater and $10^{14}$ Ωcm or less. When the volume resistivity value is $10^{18}$ Ωcm or less, the electric charges charged on powder coating material 2 do not become excessively high, and thus, the repulsion phenomenon is unlikely to occur in powder layer 5 during coating. When the volume resistivity value is $10^8$ Ωcm or greater, the charge amount does not become excessively low, and the discharge of electric charges tends to be kept in an excellent range. Therefore, powder coating material 2 is less likely to fall off. Examples of non-conducting materials include: resins such as alkyd resins, acrylic resins, amino resins, epoxy resins, phenol resins, unsaturated polyester resins, silicone resins, polyphenylene ethers, and polycarbonate; and ceramics such as alumina, zirconia, barium titanate, silicon nitride, aluminum nitride, and silicon carbide.

The thickness of powder layer 5 is 100 μm or less. The average particle size of the particles that form powder layer 5 is, for example, 10 μm or less. In other words, powder layer 5 may be formed by using powder coating material 2 having an average particle size of particles of 10 μm or less. By using powder coating material 2 having an average particle size of 10 μm or less, the thickness of powder layer 5 of 100 μm or less can be easily realized.

An average of the total value of the number of powder aggregates having a long diameter of 500 μm or greater and pinholes having a long diameter of 500 μm or greater, in any of a plurality of different regions of 20 mm×20 mm on the surface of powder layer 5, is 0.2 pieces/cm² or less. In fine particle powder coating material 2 having an average particle size of 10 μm or less, the adhesion between particles due to van der Wags force, electrostatic force, liquid cross-linking force, and the like is generally dominated rather than the gravity of the particles themselves, and it becomes easy to aggregate particles rapidly. Therefore, when using powder coating material 2 for powder coating without cracking or crushing, powder aggregates or pinholes are likely to occur in coating film 51. Coating defects such as powder clogging in the powder coating apparatus may also occur. However, by forming powder layer 5 by the powder coating apparatus and the powder coating method described later, powder layer 5 having few powder aggregates and pinholes can be formed.

The average of the total value of the number of powder aggregates having a long diameter of 100 μm or greater and 500 μm or less and the number of pinholes having a long diameter of 100 μm or greater and 500 μm or less, in any of a plurality of different regions of 4.0 mm×6.0 mm on the surface of powder layer 5 is, for example, 10 pieces/cm² or less. In this case, coating film 51 obtained by heating or pressing powder layer 5 can have more excellent quality. The average of the total value of the number of powder aggregates having a long diameter of 50 μm or greater and 100 μm or less and the number of pinholes having a long diameter of 50 μm or greater and 100 μm or less, in any of a plurality of different regions of 0.4 mm×0.6 mm on the surface of powder layer 5 may be 10 pieces/cm² or less.

The concentration of the solvent contained in powder layer 5 may be a very small amount, for example, 50 ppm or less. In other words, powder layer 5 may be formed by using powder coating material 2 which does not substantially contain a solvent. By not using a solvent for the coating, it is possible to realize an environmentally friendly coating. When the fine particles are coated using a solvent, cracks and the like are likely to occur in coating film 51 formed by heating or pressing powder layer 5. However, when powder layer 5 is coated with powder coating material 2 which does not substantially contain a solvent, coating film 51 formed of powder layer 5 is less likely to be cracked, and coating film 51 having high quality can be obtained.

Coating Film 51

Coating film 51 of (c) of FIG. 1 is obtained by heating or pressing powder layer 5 formed on base 1 of (b) of FIG. 1. The thickness of coating film 51 is 100 μm or less. Coating film 51 contains powder having an average particle size of 10 μm or less.

Surface roughness Ra of coating film 51 is 5.0 μm or less. When surface roughness Ra is 5.0 μm or less, coating film 51 has an excellent surface appearance, and coating film 51 having a uniform surface and having a high quality is achieved.

When the change rate is a value obtained by dividing an original profile value, which is obtained by measuring a signal intensity derived from a composition of base 1 at a total of 500 points every 10 μm between any two points separated by 5.0 mm on the surface of coating film 51, by a moving average value of sections at ten points, a change rate is, for example, within a range of 100±99%. The signal intensity profile is measured by energy dispersion type X-ray analysis (Energy Dispersive X-ray microanalysis (EDX)).

It is considered that such signal intensity is realized by having few voids inside coating film 51. Since there are few voids inside coating film 51, base 1 is less likely to corrode, and thus, coating film 51 contributes to the durability of base 1. Since there are few voids inside coating film 51, the signal intensity derived from base 1 tends to be uniform over the entire coating film 51. Therefore, for example, when coating film 51 is used as an electrode layer of a power storage device or the like, the performance of the electrode can be improved.

Powder Coating Method and Powder Coating Apparatus

A powder coating method for forming powder layer 5 and a powder coating apparatus used for forming powder layer 5 according to the disclosure will be described in detail. Specifically, a powder coating method and a powder coating apparatus for forming coating film 51 by powder coating using powder having an average particle size of 10 µm or less will be described.

Figure 2:
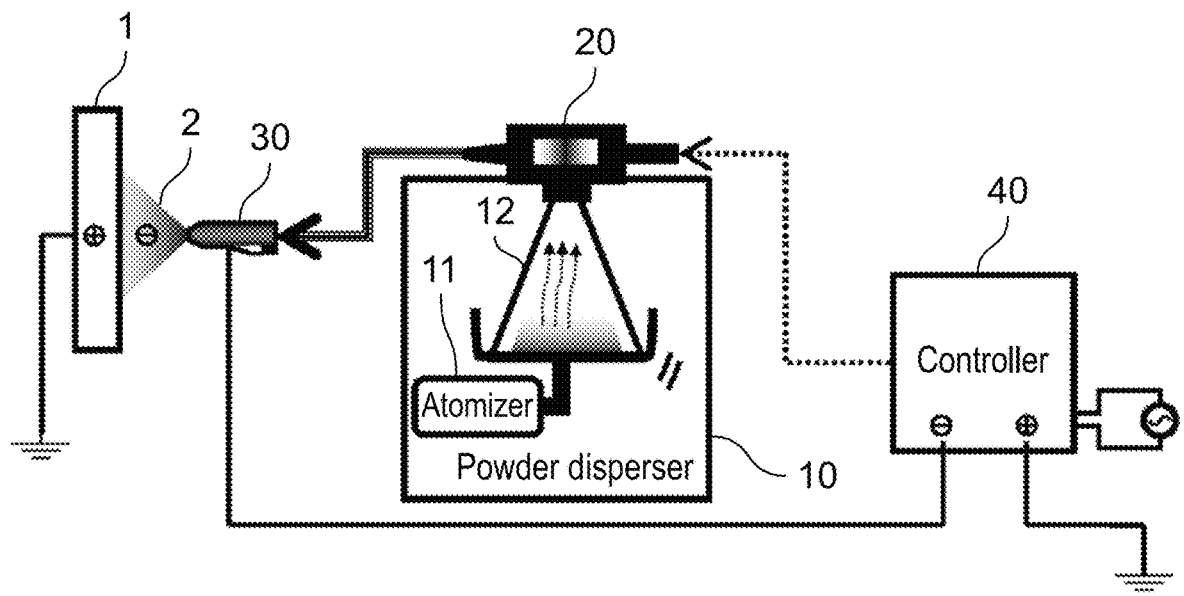
FIG. 2 is a schematic view of a powder coating apparatus according to the exemplary embodiment of the disclosure.

FIG. 2 illustrates the powder coating apparatus of the exemplary embodiment. The powder coating apparatus, spray gun 30 having a built-in high-voltage corona discharge electrode, powder supplier 20, powder disperser 10, and control device 40 are provided.

First, powder coating material 2 is supplied to powder disperser 10, and the powder in powder coating material 2 is dispersed to remove powder aggregates. Powder disperser 10 includes, for example, atomizer 11 and cup 12. Atomizer 11 disperses the powder by, for example, crushing and atomizing the powder in cup 12 by ultrasonic vibration. Although FIG. 2 illustrates an example in which powder disperser 10 includes only atomizer 11 and cup 12, powder disperser 10 may further include, for example, a jet mill as a crusher, supply the powder crushed by the crusher to cup 12, and disperse powder by atomizer 11. As the crusher, powder disperser 10 may include at least one selected from the group consisting of an air flow type fine crusher such as a jet mill, a grinding type fine crusher such as a roller mill, a stirring type fine crusher such as a planetary ball mill, a vibration type fine crusher such as a vibrating ball mill, a swirling air flow type air classifier such as a cyclone, a centrifugal type classifier, and a vibration screen type classifier. By using these devices, powder coating material 2 can be crushed or cracked to a predetermined size. Powder disperser 10 can remove powder aggregates by providing a classifier as needed. Therefore, the powder containing fine particles can be excellently dispersed. Powder disperser 10 may include, as cup 12, at least one of an ultrasonic vibrator that ultrasonically vibrates the powder and a voltage applier that applies a high voltage to the powder. The powder can be atomized by ultrasonically vibrating the powder or applying a high voltage to the powder. Accordingly, it is possible to more excellently disperse the powder.

Next, powder layer 5 is formed on base 1 by directly supplying the dispersed powder onto base 1 without storing the powder. In FIG. 2, the dispersed powder is directly supplied to powder supplier 20 connected to powder disperser 10. As illustrated in FIG. 2, since powder disperser 10 and powder supplier 20 such as an injector are connected to each other, powder coating material 2 dispersed by powder disperser 10 can be directly supplied to powder supplier 20. Furthermore, as illustrated in (a) of FIG. 1, powder coating material 2 transported from powder supplier 20 together with air in a supply hose is electrostatically applied by spray gun 30 and sprayed onto base 1. Accordingly, as illustrated in (b) of FIG. 1, powder layer 5 is formed of powder coating material 2 on base 1. By heating or pressing powder layer 5 as necessary, coating film 51 can be formed of powder coating material 2 on base 1 as illustrated in (c) of FIG. 1.

Even when fine particles having an average particle size of 10 µm or less are dispersed by powder disperser 10 to remove powder aggregates, there is concern that the fine particles are temporarily stored in a container and reaggregate. However, by transporting the dispersed powder from powder supplier 20 to spray gun 30 without storing the powder, the powder can be supplied onto base 1 in an air-dispersed state, that is, in an aerosol state. Therefore, powder layer 5 having few powder aggregates and pinholes can be obtained, and high-quality coating film 51 can be obtained.

Powder disperser 10 may include only one of atomizer 11 and cup 12 described above. Only one cup 12 may be included, or two or more cups 12 may be included. Only one atomizer 11 may be included, or two or more atomizers 11 may be included. From the viewpoint of excellently dispersing powder coating material 2, the powder coating apparatus may include two or more powder dispersers 10. Powder disperser 10 may include, for example, both a fine crusher such as an air flow type fine crusher, a grinding type fine crusher, a stirring type fine crusher, and a vibration type fine crusher, and a classifier such as a swirling air flow type air classifier, a centrifugal type classifier, and a vibration screen type classifier. As powder disperser 10, both a fine crusher and an atomizing device such as an ultrasonic vibrator and a voltage applier may be used. Both a classifier and an atomizing device may be provided. From the viewpoint of enhancing dispersibility, a fine crusher, a classifier, and an atomizing device may all be provided. Powder disperser 10 may be provided with a plurality of fine crushers, may be provided with a plurality of classifiers, and may be provided with a plurality of atomizing devices. When powder disperser 10 includes a fine crusher, a classifier, and an atomizing device, the order of application to the powder is not particularly limited. For example, after crushing the powder using a fine crusher, and further, after removing the powder aggregates using a classifier, the powder may be atomized using an atomizing device.

Powder disperser 10 may function as powder supplier 20. For example, when a fine crusher is used as powder disperser 10, powder coating material 2 dispersed directly from the fine crusher to spray gun 30 may be supplied without going through powder supplier 20 such as an injector.

Figure 3:
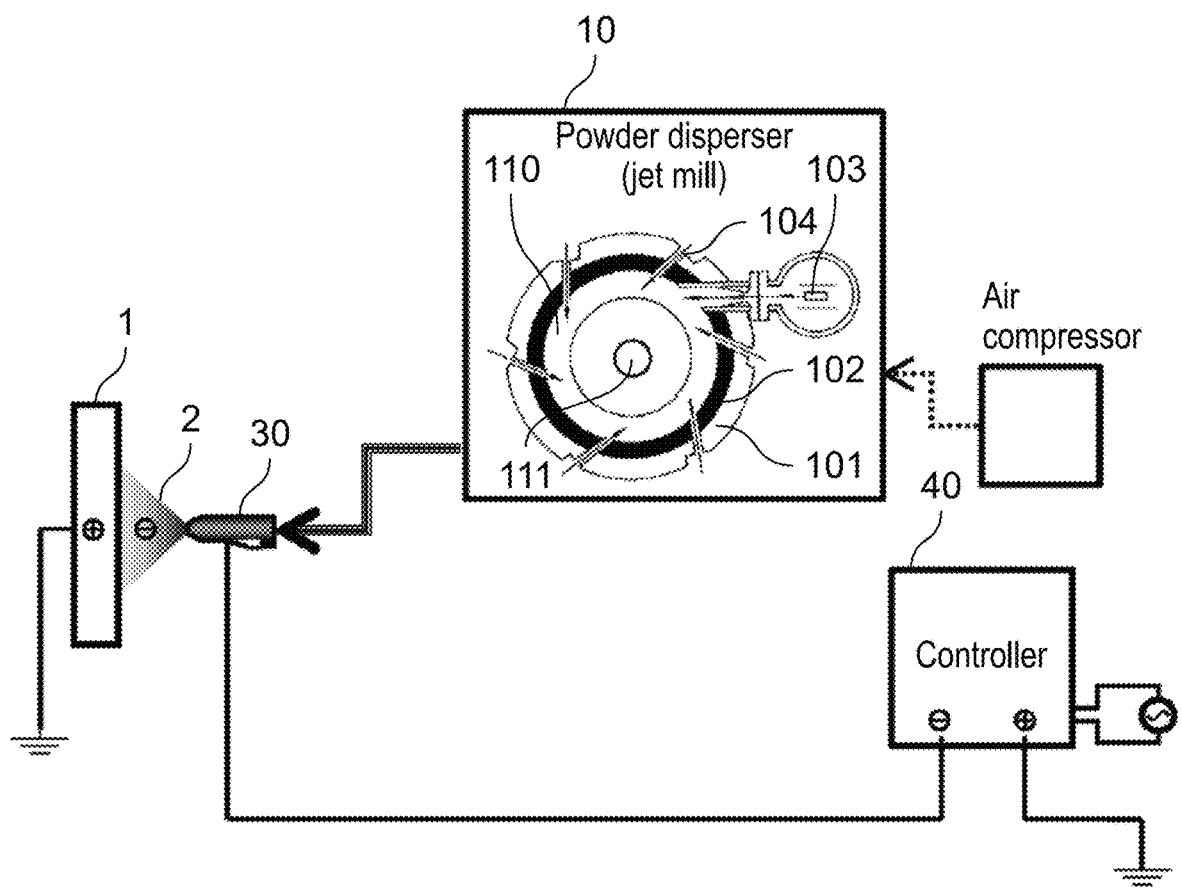
FIG. 3 is a schematic view of the powder coating apparatus used in an example of the disclosure.

The powder coating apparatus is not limited to the configuration illustrated in FIG. 2, and may have the configuration illustrated in FIG. 3. The powder coating apparatus of FIG. 3 is different from that of FIG. 2 in that powder supplier 20 is deleted and powder disperser 10 is a jet mill as a crusher. The differences will be mainly described below. The powder disperser 10 of FIG. 3 schematically illustrates a horizontal cross section of a jet mill. The jet mill has mill frame 101, ceramic liner 102, pusher nozzle 103, a plurality of gliding nozzles 104, crushing zone 110, and outlet 111.

Ceramic liner 102 is fitted into mill frame 101.

The plurality of gliding nozzles 104 are provided below crushing zone 110 and blow compressed air into crushing zone 110.

Pusher nozzle 103 discharges the powder into crushing zone 110. The discharged powder is blown into crushing zone 110 by the compressed air. The plurality of gliding nozzles 104 blow compressed air into crushing zone 110. Accordingly, the powder is crushed by swirling around crushing zone 110 and colliding with each other. The powder is classified by the centrifugal force of the swirling motion, the fine powder is discharged from outlet 111, and the coarse powder is repeatedly crushed in crushing zone 110.

The jet mill is configured to supply the dispersed powder directly from outlet 111 onto base 1 via spray gun 30 without storing the dispersed powder.

Example

Examples of the present exemplary embodiment will be described below, but the disclosure is not limited to these examples.

Preparation of Powder Layer Composite 100 and Coating Film 51

Example 1

Polyacrylate particles (manufactured by Soken Kagaku Co., Ltd., monodisperse acrylate particles, product number MP-1000, average particle size 0.40 μm) was used as powder coating material 2, and a sheet obtained by punching electrolytic copper foil (manufactured by JX Nippon Mining & Metals Co., Ltd., product number JTCSLC) into a size of 70 mm×70 mm was used as base 1. The powder coating apparatus used, as an electrostatic powder coating apparatus, the hand gun system GX8500aCS type (coating material supply device, powder spray gun GX132 type negative ion gun, and control controller GX385a type set) manufactured by Parker Engineering Co., Ltd, as a base. In this electrostatic powder coating apparatus, as illustrated in FIG. 2, cup 12 for accommodating powder was disposed at the lower portion of the injector as powder supplier 20, and aerosol-like powder coating material 2 atomized by atomizer 11 that applies the ultrasonic vibration from the lower portion of cup 12 was sucked into the injector. Atomizer 11 used a DGS oscillator manufactured by Artech Ultrasonic Systems of Switzerland and a C35-SD8 (corresponding to high amplitude) converter, as the ultrasonic vibrator. At the time of coating, the distance from the tip of spray gun 30 to base 1 was disposed so as to be in the range of 100 to 200 mm. The electrolytic copper foil, which is base 1, was masked with a size of 20 mm×20 mm, powder coating material 2 was sprayed onto the metal mask under the conditions illustrated in Table 1 of FIG. 9 below, powder layer 5 was formed on base 1, and powder layer composite 100 was obtained. Obtained powder layer composite 100 was heated at 250° C. for 1 hour to obtain coating film 51 on base 1.

Example 2

Powder disperser 10 of Example 2 includes the jet mill of FIG. 3 instead of the configuration including the injector, the cup, and the ultrasonic vibrator of Example 1. Powder layer composite 100 and coating film 51 were obtained by the same configuration and method as those in Example 1 except that the jet mill was directly connected to spray gun 30. For the jet mill, the supply hose was directly connected to the spray gun using an AO jet mill (ultra-small amount lab jet mill) manufactured by Seishin Enterprise Co., Ltd.

Example 3

Powder disperser 10 of Example 3 has a configuration in which two jet mills are connected to each other in series. Powder layer composite 100 and coating film 51 were obtained by the same configuration and method as those in Example 2 except that two jet mills were connected to each other in series. Table 2 of FIG. 10 illustrates the characteristics of powder layer 5 and coating film 51.

Comparative Example 1

Using a slurry in which powder coating material 2 used in Example 1 was dispersed in ethanol so as to be 20% by weight, guide coating was performed with an applicator adjusted so that the coating gap is 0.5 mm. As base 1, the same one as that in Example 1 was used. After the coating, the slurry layer formed on base 1 was dried and heated under the same conditions as those in Example 1 to obtain coating film 51.

Comparative Example 2

In Comparative Example 2, a powder coating apparatus in which atomizer 11 of FIG. 2 is deleted and powder supplier 20 and cup 12 are arranged upside down was used. In other words, by the same method as that in Example 1 except that the ultrasonic vibrator, which is the powder disperser, was not used, and cup 12 was disposed not at the lower portion but at the upper portion of the injector as the powder supplier 20, powder layer composite 100 and coating film 51 were obtained.

Comparative Example 3

By the same method as that in Example 1 except that air was supplied from the lower portion of the tank and powder coating material 2 in the form of a jet powder (aerosol) blown up by the air is sucked into the injector for coating, powder layer composite 100 and coating film 51 were formed. In Comparative Example 3, since the amount of aerosolized jet powder was extremely small, the amount of spray was small and powder layer 5 could not be formed on base 1. Therefore, the evaluation test described later was not performed in Comparative Example 3.

Evaluation Test

Thickness

Regarding coating film 51 obtained in Examples 1 to 3 and Comparative Examples 1 and 2, by using a digital micrometer (MODEL MDQ-30MX manufactured by Mitutoyo Co., Ltd.), a difference between the average value of seven points excluding the maximum value and the minimum value of the thickness data of nine points, which was measured from coating film 51 having a size of 20 mm×20 mm, and the thickness of base 1, which was measured by the same method, was calculated and used as the thickness of coating film 51. The result is illustrated in Table 2 of FIG. 10.

Number of Powder Aggregates and Pinholes

Regarding powder layer 5 in powder layer composite 100 obtained in Examples 1 to 3 and Comparative Example 2, the number of powder aggregates and pinholes formed by the powder aggregates falling off from powder layer 5 was counted according to the defect size using a digital microscope (VHX-900 manufactured by Keyence Co., Ltd.). When observing powder aggregates and pinholes of 500 μm or greater, the size of the long diameter of the abnormal portion was measured with ×10 times field of view of the digital microscope while focusing on the abnormal points that were visually confirmed in advance in five regions of the powder layer of 20 mm×20 mm, and the number of powder aggregates and pinholes was counted. Similarly, for powder aggregates and pinholes having a long diameter of 100 μm or greater and less than 500 μm, five regions of a powder layer of 4.0 mm×6.0 mm, which could be visually observed with a ×10 times field of view of the digital microscope, were randomly observed, and the number of defects of the size was counted. For powder aggregates and pinholes having a long diameter of 50 μm or greater and less than 100 μm, five regions of a powder layer of 0.4 mm×0.6 mm, which could be visually observed with a ×100 times field of view, were randomly observed, and the number of defects of the size was counted. Furthermore, in any of the measurements of the number of defects, the average value of the five measured values obtained by measuring once in each of the five different regions was defined as the number of defects. The result is illustrated in Table 2 of FIG. 10. The powder aggregates and the pinholes have a circular, elliptical or polygonal shape, or a combined shape thereof. The long diameter means the length of the line segment connecting the two farthest points to each other in the powder aggregate and the pinhole.

Figure 4:
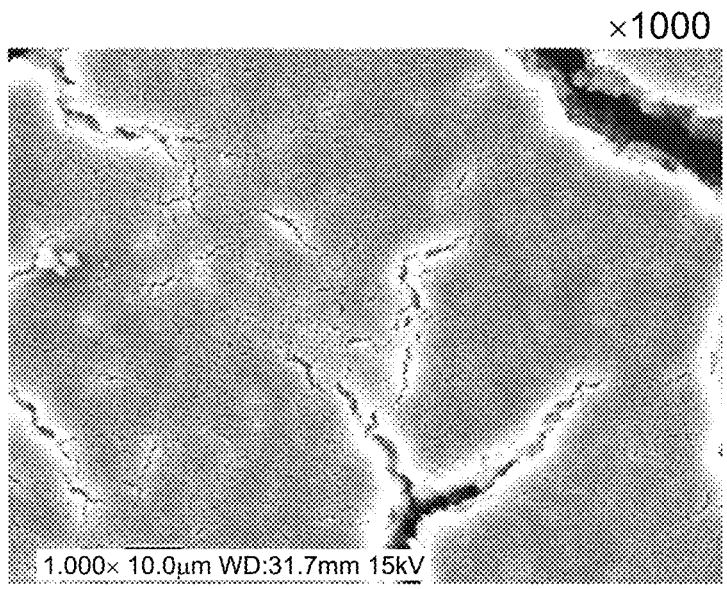
FIG. 4 is a view illustrating a 1000 times SEM image of a coating film of Comparative Example 1 and a 10000 times SEM image of the coating film of Comparative Example 1.
Figure 4:
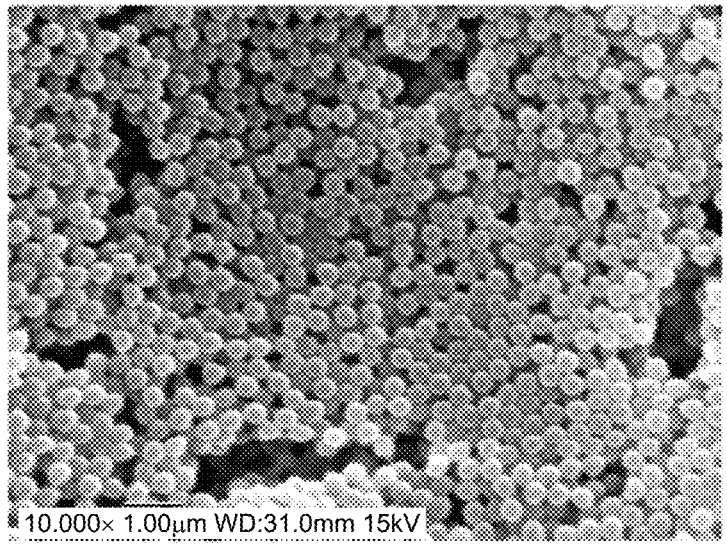

In Comparative Example 1, as illustrated in FIG. 4, since cracks were generated in the slurry layer in the drying process, the number of powder aggregates and pinholes was not measured. (a) of FIG. 4 is a 1000 times SEM image of coating film 51 of Comparative Example 1, and (b) of FIG. 4 is a 10000 times SEM image.

Arithmetic Average Roughness Ra

Regarding coating film 51 obtained in Examples 1 to 3 and Comparative Examples 1 and 2, in accordance with JIS-B0601, by using a shape measurement laser microscope (manufactured by KEYENCE Co., Ltd., VK-9700), arithmetic average roughness Ra of the surface of coating film 51 magnified 50 times with shape analysis application VK-H1A1 was measured. The result is illustrated in Table 2 of FIG. 10.

Figure 5:
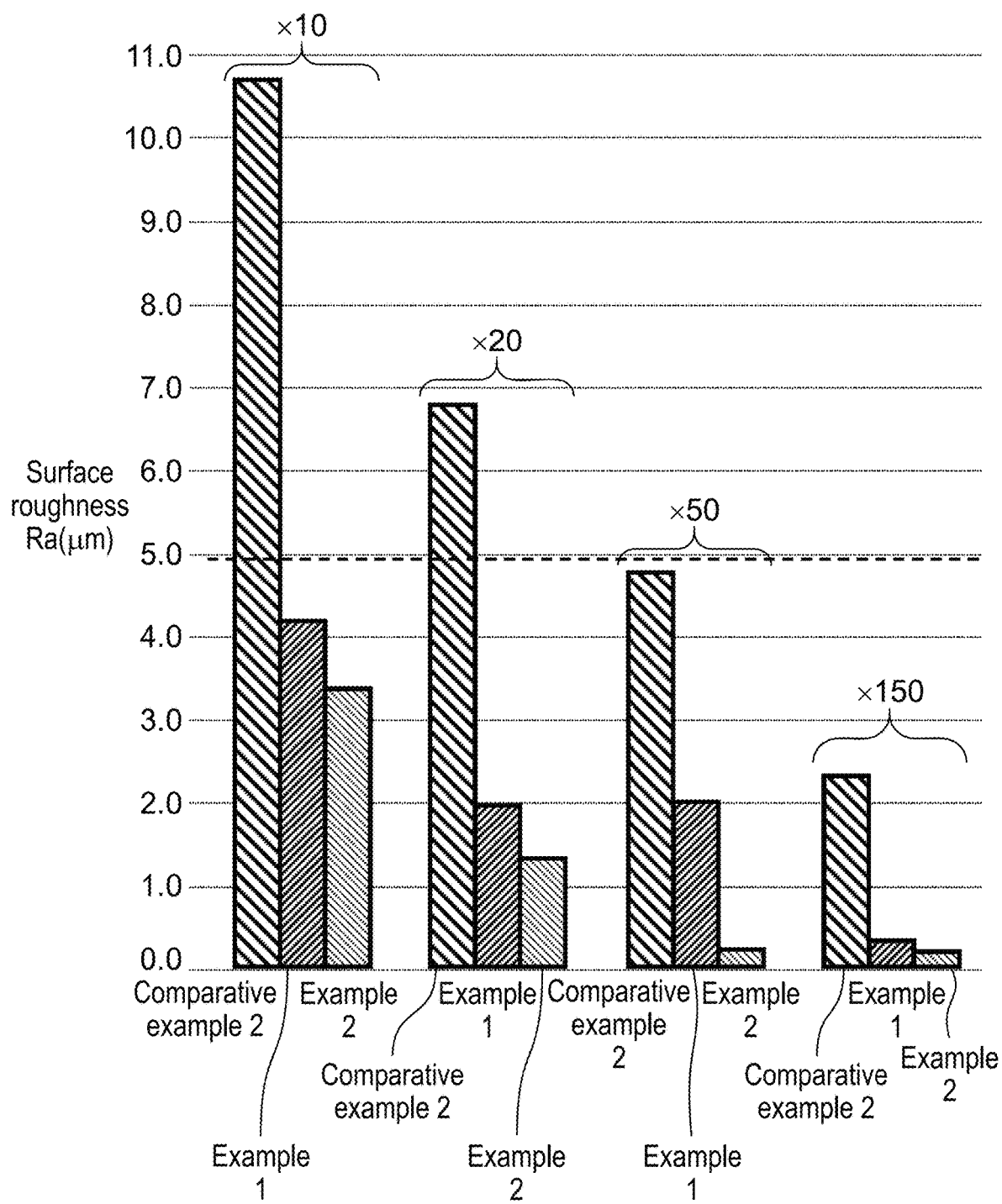
FIG. 5 is a graph illustrating arithmetic average roughness Ra of the coating film surface when the coating film of Examples 1 and 2 and Comparative Example 2 is magnified 10 times, 20 times, 50 times, and 150 times.
Figure 6:
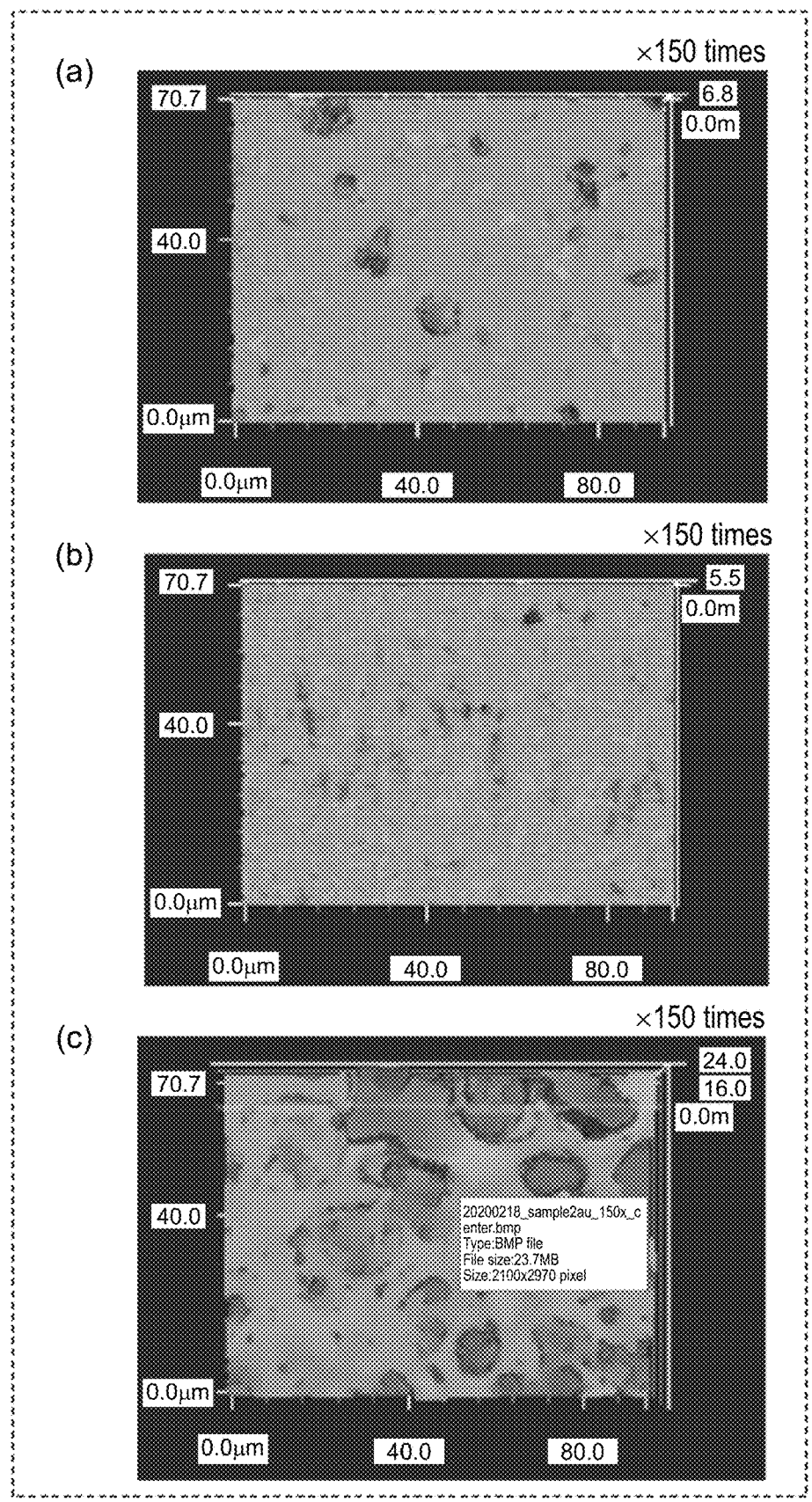
FIG. 6 is a view illustrating a three-dimensional surface image of the coating film of Examples 1 and 2 and Comparative Example 2 magnified 150 times.

FIG. 5 illustrates arithmetic average roughness Ra of the coating film surface when the coating film of Examples 1 and 2 and Comparative Example 2 is magnified 10 times, 20 times, 50 times, and 150 times. FIG. 6 is a view illustrating a three-dimensional surface image of the coating film of Examples 1 and 2 and Comparative Example 2 magnified 150 times. (a) of FIG. 6 illustrates a three-dimensional surface image of coating film 51 of Example 1 magnified 150 times. (b) of FIG. 6 illustrates a three-dimensional surface image of coating film 51 of Example 2 magnified 150 times. (c) of FIG. 6 illustrates a three-dimensional surface image of coating film 51 of Comparative Example 2.

In-Plane Void Distribution

Regarding coating film 51 obtained in Examples 1 to 3 and Comparative Examples 1 and 2, by using energy dispersion type X-ray analysis (EDX: Energy Dispersive X-ray microanalysis) (3D SEM image measurement analysis system VE-9800 manufactured by KEYENCE Co., Ltd.), the void distribution within the plane of coating film 51 was measured. The signal intensity of CuL derived from the electrolytic copper foil as base 1 was measured at a total of 500 points every 10 μm between any two points separated by 5.0 mm on the surface of coating film 51 to obtain the original profile. Table 2 of FIG. 10 illustrates the maximum value and the minimum value of the correction profile corrected by using a value obtained by dividing the original profile value by the moving average value of sections at ten points as a change rate.

Figure 7:
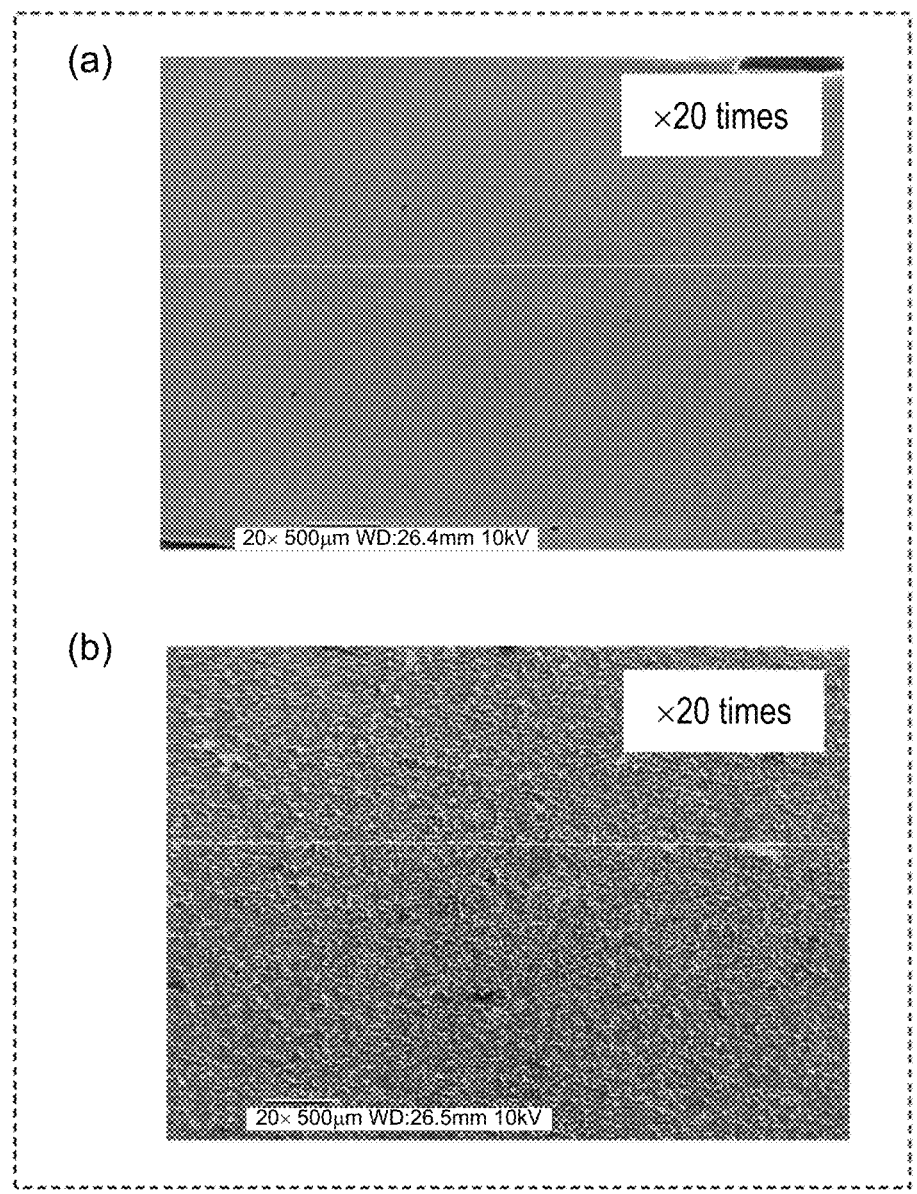
FIG. 7 is a view illustrating a 20 times SEM image of the coating film of Example 2 and Comparative Example 2.
Figure 8A:
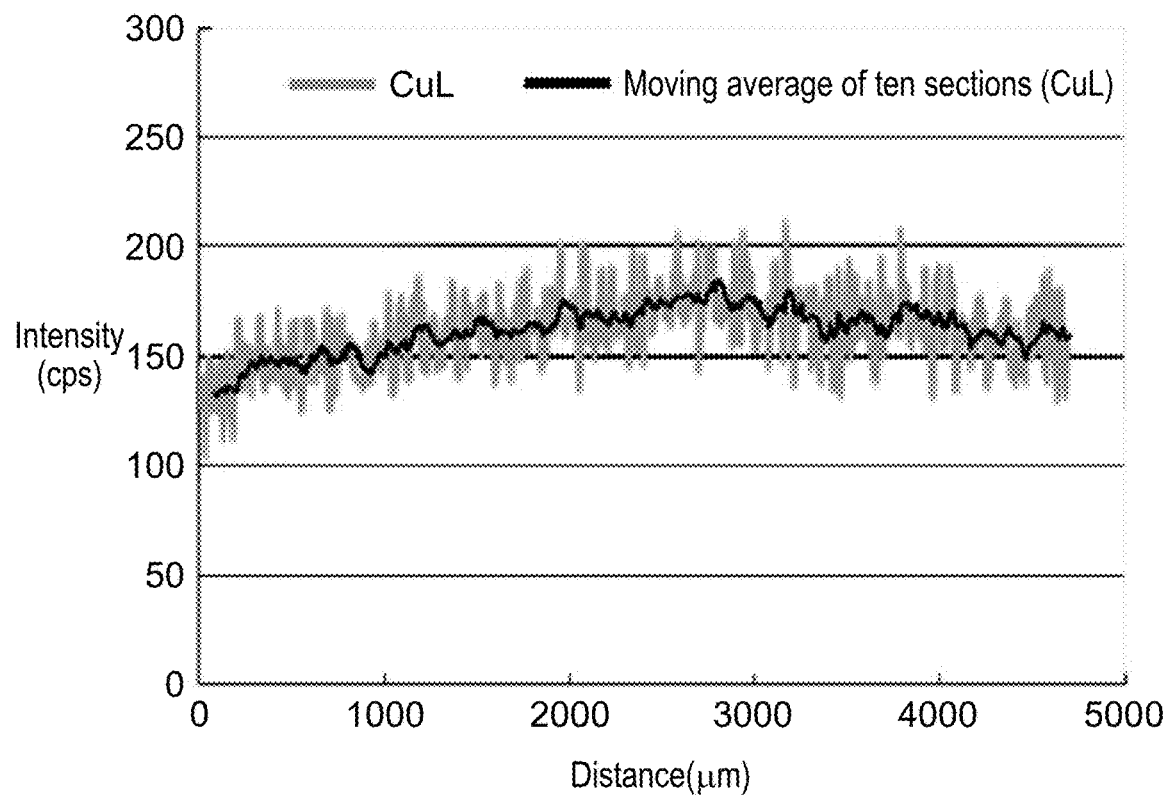
FIG. 8A is a view illustrating an original profile of EDX of Example 2.
Figure 8B:
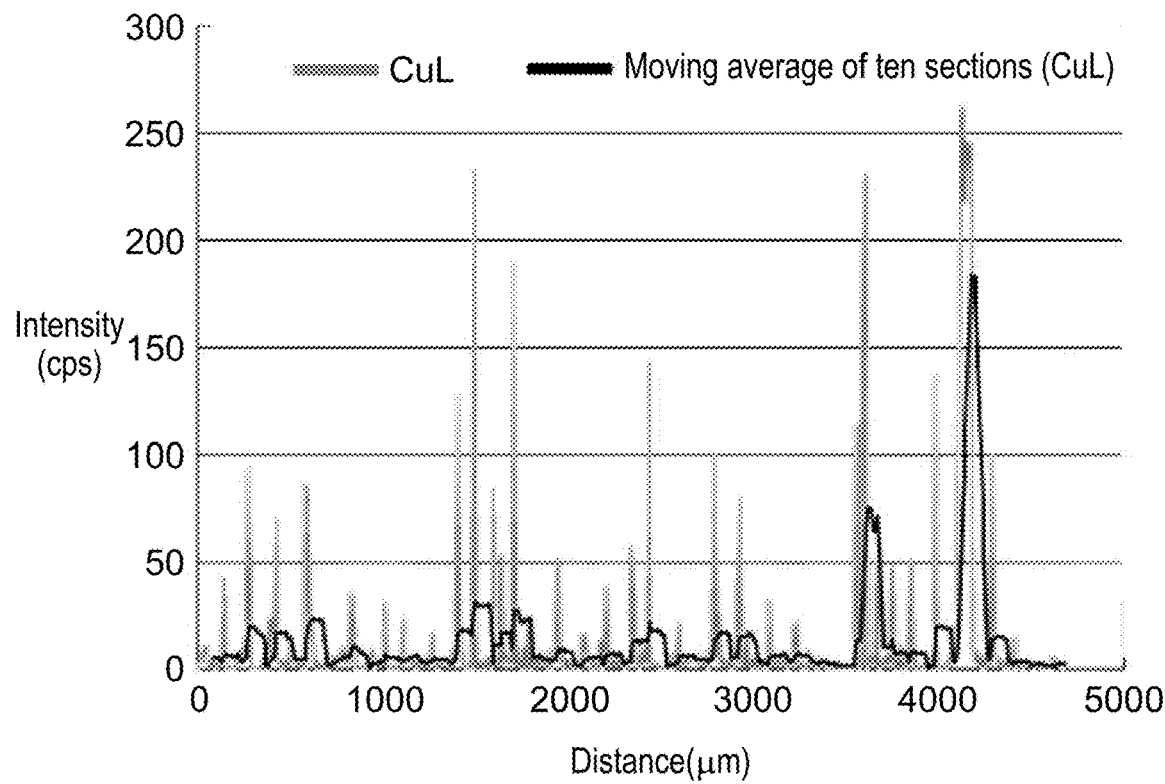
FIG. 8B is a view illustrating an original profile of EDX of Comparative Example 2.
Figure 8C:
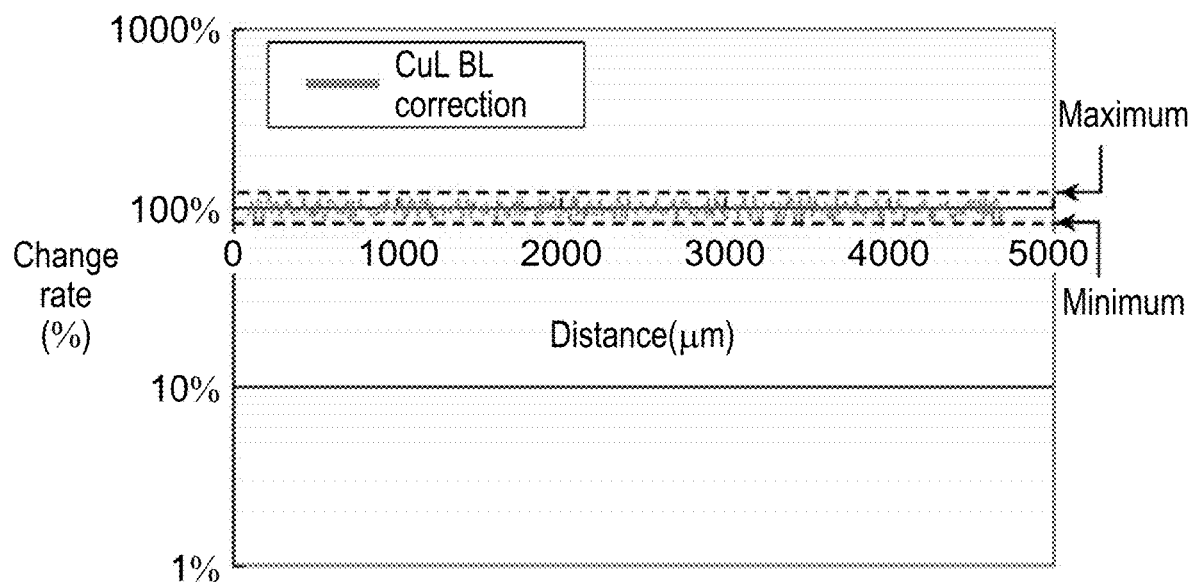
FIG. 8C is a view illustrating a correction profile of Example 2.
Figure 8D:
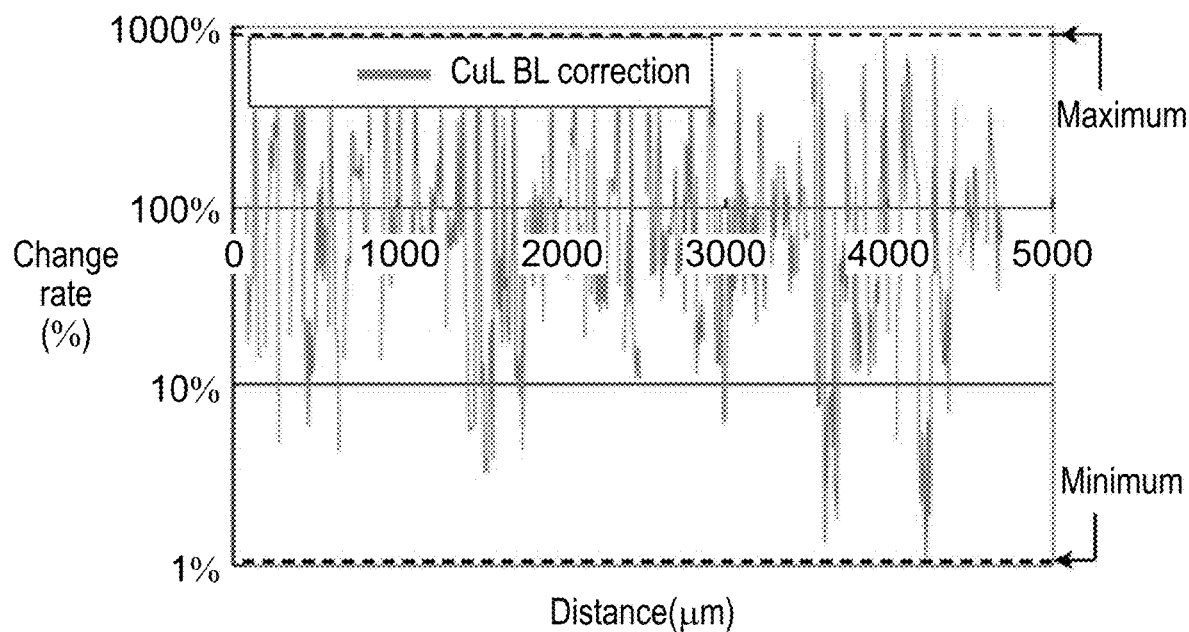
FIG. 8D is a view illustrating a correction profile of Comparative Example 2.

FIG. 7 is a view illustrating a 20 times SEM image of the coating film of Example 2 and Comparative Example 2. (a) of FIG. 7 illustrates an SEM image of the surface of coating film 51 of Example 2 magnified 20 times, and (b) of FIG. 7 illustrates an SEM image of the surface of coating film 51 of Comparative Example 2 magnified 20 times. Furthermore, FIGS. 8A and 8B illustrate the original profile of EDX of Example 2 and Comparative Example 2, respectively. FIGS. 8C and 8D illustrate the correction profile of Example 2 and Comparative Example 2, respectively.

As illustrated in Table 2 of FIG. 10, powder layer 5 of Examples 1 to 3 has less powder aggregates and pinholes than those of powder layer 5 of Comparative Example 2. Coating film 51 of Examples 1 to 3 has a thinner thickness and a lower surface roughness than those of Comparative Example 2. Therefore, it is found that coating film 51 of Examples 1 to 3 can achieve both thinning and high quality which are difficult to be achieved by the powder coating method of the related art.

As described above, powder layer composite 100 according to an aspect of the embodiment includes: base 1; and powder layer 5 having a thickness of 100 μm or less and formed on base 1, and an average of a total value of the number of powder aggregates having a long diameter of 500 μm or greater and the number of pinholes having a long diameter of 500 μm or greater, in any of a plurality of different regions of 20 mm×20 mm on a surface of powder layer 5, is 0.2 pieces/cm$^2$ or less. The average may be the average of the five total values.

According to this, high-quality coating film 51 can be formed by heating or pressing powder layer 5 as needed.

Here, the average of the total value of the number of powder aggregates having a long diameter of 100 μm or greater and 500 μm or less and the number of pinholes having a long diameter of 100 μm or greater and 500 μm or less, in any of a plurality of different regions of 4.0 mm×6.0 mm on the surface of powder layer 5 may be 10 pieces/cm$^2$ or less. The average may be the average of the five total values.

According to this, it is possible to form coating film 51 having a higher quality with less powder aggregates and pinholes.

Here, the average of the total value of the number of powder aggregates having a long diameter of 50 μm or greater and 100 μm or less and the number of pinholes having a long diameter of 50 μm or greater and 100 μm or less, in any of a plurality of different regions of 0.4 mm×0.6 mm on the surface of powder layer 5 may be 10 pieces/cm$^2$ or less. The average may be the average of the five total values.

According to this, it is possible to form coating film 51 having a higher quality with less powder aggregates and pinholes.

Here, the concentration of the solvent contained in powder layer 5 may be 50 ppm or less.

According to this, since the dry coating is used instead of the wet coating, the occurrence of cracks can be suppressed and coating film 51 having a higher quality can be formed.

Here, the average particle size of the particles that form powder layer 5 is, for example, 10 μm or less. The average particle size is a volume-based average value obtained by the light scattering method using laser light based on JIS Z 8819-2: 2001.

According to this, it is possible to form coating film 51 having a higher quality with narrow particle size.

Coating film 51 according to the aspect of the embodiment has a thickness of 100 μm or less, is provided on base 1, and has surface roughness Ra of coating film 51 of 5.0 μm or less.

According to this, coating film 51 having a thickness of 100 μm or less can be made with high quality.

Here, when the change rate is a value obtained by dividing an original profile value, which is obtained by measuring a signal intensity derived from a composition of base 1 at a total of 500 points every 10 μm between any two points separated by 5.0 mm on the surface of coating film 51, by a moving average value of sections at ten points, a change rate may be within a range of 100±99%.

According to this, the surface roughness of coating film 51 can be reduced and the uniformity can be improved.

The powder coating method according to the aspect of the embodiment is a powder coating method for forming coating film 51 using powder having an average particle size of 10

µm or less, the method including: removing powder aggregates by dispersing the powder; and forming powder layer 5 on base 1 by directly supplying the dispersed powder onto base 1 without storing the powder.

According to this, first, powder layer 5 can be formed, and coating film 51 having a higher quality can be formed of powder layer 5.

Here, when dispersing the powder, dispersing may be performed using at least one selected from a group consisting of an air flow type fine crusher, a grinding type fine crusher, a stirring type fine crusher, a vibration type fine crusher, a swirling air flow type air classifier, a centrifugal type classifier, and a vibration screen type classifier.

According to this, various fine crushers and classifiers can be used for dispersing the powder, and the powder can be dispersed excellently.

Here, when dispersing the powder, dispersing may be performed by performing atomization using at least one of ultrasonic vibration and high voltage application.

According to this, at least one of ultrasonic vibration and high voltage application can be used for dispersing the powder, and the powder can be dispersed excellently.

Here, in forming powder layer 5, the dispersed powder may be supplied onto base 1 in an air-dispersed state.

According to this, since the powder is supplied onto base 1 in an air-dispersed state, that is, in an aerosol state, powder layer 5 having few powder aggregates and pinholes can be obtained, and coating film 51 having a higher quality can be obtained.

The powder coating apparatus according to the aspect of the embodiment includes: powder disperser 10 that disperses powder; and powder supplier 20 that is connected to the powder disperser and supplies the dispersed powder directly onto a base without storing the powder.

According to this, first, powder layer 5 can be formed, and coating film 51 having a higher quality can be formed of powder layer 5.

Powder disperser 10 may include, for example, at least one of an air flow type fine crusher, a grinding type fine crusher, a stirring type fine crusher, a vibration type fine crusher, a swirling air flow type air classifier, a centrifugal type classifier, and a vibration screen type classifier.

According to this, various fine crushers and classifiers can be used for dispersing the powder, and the powder can be dispersed excellently.

Here, powder disperser 10 may include at least one of an ultrasonic vibrator that ultrasonically vibrates the powder and a voltage applier that applies a high voltage to the powder.

According to this, at least one of ultrasonic vibration and high voltage application can be used for dispersing the powder, and the powder can be dispersed excellently.

According to an aspect of the present disclosure, there is provided a powder coating method for forming coating film using powder having an average particle size of 10 µm or less. The powder coating method includes: dispersing the powder to remove powder aggregates; and forming a powder layer on the base by directly supplying the dispersed powder onto the base without storing the powder.

According to the powder coating method of the aspect, in the dispersing of the powder, dispersing may be performed using at least one selected from the group consisting of an air flow type fine crusher, a grinding type fine crusher, a stirring type fine crusher, a vibration type fine crusher, a swirling air flow type air classifier, a centrifugal type classifier, and a vibration screen type classifier.

According to the powder coating method of the aspect, in the dispersing of the powder, dispersing may be performed by performing atomization using at least one of ultrasonic vibration and high voltage application.

According to the powder coating method of the aspect, in the forming of the powder layer, the dispersed powder may be supplied onto the base in an air-dispersed state.

According to the powder layer composite, the coating film, the powder coating method, and the powder coating apparatus according to the disclosure, a high-quality coating film can be formed even when fine particle powder is used.

Above, powder layer composite 100, coating film 51, the powder coating method, and the powder coating apparatus according to the disclosure are described based on the exemplary embodiments and examples, but the present disclosure is not limited to these exemplary embodiments and examples. As long as the gist of the present disclosure is not deviated, various modifications that can be conceived by those skilled in the art are applied to the exemplary embodiments and examples, and the exemplary embodiments constructed by combining the configuration elements of different embodiments and examples are also within the scope of the present disclosure.

According to powder layer composite 100, coating film 51, the powder coating method, and the powder coating apparatus of the disclosure, high-quality coating film 51 can be obtained even when the powder having fine particles is used, and thus, application to the formation of an electrode layer of a power storage device, such as a condenser, a capacitor, and a battery, is possible.

What is claimed is:

1. A powder layer composite comprising:
   a base; and
   a powder layer consisting of at least one non-conducting material, and having a thickness of 100 µm or less and disposed on the base, wherein
   an average of a total value of a number of powder aggregates having a long diameter of 500 µm or greater and a number of pinholes having a long diameter of 500 µm or greater, in any of a plurality of different regions of 20 mm×20 mm on a surface of the powder layer, is 0.2 pieces/cm$^2$ or less.

2. The powder layer composite of claim 1, wherein
   an average of a total value of the number of powder aggregates having a long diameter of 100 µm or greater and 500 µm or less and the number of pinholes having a long diameter of 100 µm or greater and 500 µm or less, in any of a plurality of different regions of 4.0 mm×6.0 mm on the surface of the powder layer, is 10 pieces/cm$^2$ or less.

3. The powder layer composite of claim 1, wherein
   an average of a total value of the number of powder aggregates having a long diameter of 50 µm or greater and 100 µm or less and the number of pinholes having a long diameter of 50 µm or greater and 100 µm or less, in any of a plurality of different regions of 0.4 mm×0.6 mm on the surface of the powder layer, is 10 pieces/cm$^2$ or less.

4. The powder layer composite of claim 1, wherein
   a concentration of a solvent contained in the powder layer is 50 ppm or less.

5. The powder layer composite of claim 1, wherein
   an average particle size of particles that form the powder layer is 10 µm or less.

6. The powder layer composite of claim 1, wherein the at least one non-conducting material is selected from the group consisting of a resin and a ceramic.

7. The powder layer composite of claim 1, wherein the at least one non-conducting material is selected from the group consisting of an alkyd resin and a ceramic.

8. The powder layer composite of claim 1, wherein the at least one non-conducting material is selected from the group consisting of an alkyd resin, an acrylic resin, an amino resin, an epoxy resin, a phenol resin, an unsaturated polyester resin, a silicone resin, a polyphenylene ether, a polycarbonate, alumina, zirconia, barium titanate, silicon nitride, aluminum nitride and silicon carbide.

9. A powder layer composite comprising:

a base; and a powder layer having a thickness of 23.5 µm or less and disposed on the base, wherein an average of a total value of a number of powder aggregates having a long diameter of 500 µm or greater and a number of pinholes having a long diameter of 500 µm or greater, in any of a plurality of different regions of 20 mm×20 mm on a surface of the powder layer, is 0.2 pieces/cm$^2$ or less.

10. The powder layer composite of claim 9, wherein an average of a total value of the number of powder aggregates having a long diameter of 100 µm or greater and 500 µm or less and the number of pinholes having a long diameter of 100 µm or greater and 500 µm or less, in any of a plurality of different regions of 4.0 mm×6.0 mm on the surface of the powder layer, is 10 pieces/cm$^2$ or less.

11. The powder layer composite of claim 9, wherein an average of a total value of the number of powder aggregates having a long diameter of 50 µm or greater and 100 µm or less and the number of pinholes having a long diameter of 50 µm or greater and 100 µm or less, in any of a plurality of different regions of 0.4 mm×0.6 mm on the surface of the powder layer, is 10 pieces/cm$^2$ or less.

12. The powder layer composite of claim 9, wherein a concentration of a solvent contained in the powder layer is 50 ppm or less.

13. The powder layer composite of claim 9, wherein an average particle size of particles that form the powder layer is 10 µm or less.

* * * * *